US007437323B1

(12) United States Patent
Valkov et al.

(10) Patent No.: US 7,437,323 B1
(45) Date of Patent: Oct. 14, 2008

(54) METHOD AND SYSTEM FOR SPOT PRICING VIA CLUSTERING BASED DEMAND ESTIMATION

(75) Inventors: Theodore V. Valkov, New Orleans, LA (US); Michael Wisniewski, Kingwood, TX (US); Navin Aswal, Houston, TX (US); Viroj Buraparate, Kingwood, TX (US)

(73) Assignee: Pros Revenue Management; L.P., Houston, TX (US)

( * ) Notice: Subject to any disclaimer, the term of this patent is extended or adjusted under 35 U.S.C. 154(b) by 1017 days.

(21) Appl. No.: 10/604,090

(22) Filed: Jun. 25, 2003

(51) Int. Cl.
*G06Q 40/00* (2006.01)
(52) U.S. Cl. .................................. 705/36 R
(58) Field of Classification Search ............. None
See application file for complete search history.

(56) References Cited

U.S. PATENT DOCUMENTS

| | | | | |
|---|---|---|---|---|
| 5,960,407 | A * | 9/1999 | Vivona | 705/10 |
| 6,963,854 | B1 * | 11/2005 | Boyd et al. | 705/37 |
| 6,995,675 | B2 * | 2/2006 | Curkendall et al. | 340/573.3 |
| 7,085,739 | B1 * | 8/2006 | Winter et al. | 705/37 |
| 7,133,848 | B2 * | 11/2006 | Phillips et al. | 705/400 |
| 2002/0152111 | A1 * | 10/2002 | Cox et al. | 705/10 |
| 2002/0174053 | A1 * | 11/2002 | Tan | 705/37 |
| 2004/0111308 | A1 * | 6/2004 | Yakov | 705/8 |
| 2004/0128261 | A1 * | 7/2004 | Olavson et al. | 705/400 |
| 2004/0249696 | A1 * | 12/2004 | Mathews et al. | 705/10 |
| 2005/0278262 | A1 * | 12/2005 | Cheliotis et al. | 705/400 |
| 2006/0265323 | A1 * | 11/2006 | Winter et al. | 705/37 |

OTHER PUBLICATIONS

See cluster—Synonyms from Thesaurus.com, available at http://www.thesaurus.reference.com/browse/cluster.*

* cited by examiner

*Primary Examiner*—Hani M. Kazimi
*Assistant Examiner*—Michael R Zecher
(74) *Attorney, Agent, or Firm*—Sprinkle IP Law Group

(57) ABSTRACT

A method and system can be used to determine an optimal price of a commodity on a spot market. Market state conditions can be generated using historical data, such as transactional and other data. The market state conditions may include nearly any number of attributes, and the forecast market state conditions may include a forecast price for the commodity during the next time period. The historical data and market state condition may be used in a clustering module that separates the data into clusters. The cluster with the market state condition is identified, and the data in that cluster is used to generate a price-demand curve for the next time period. The price for the commodity on the spot market during that time period can be determined consistent with the company's business rules.

17 Claims, 4 Drawing Sheets

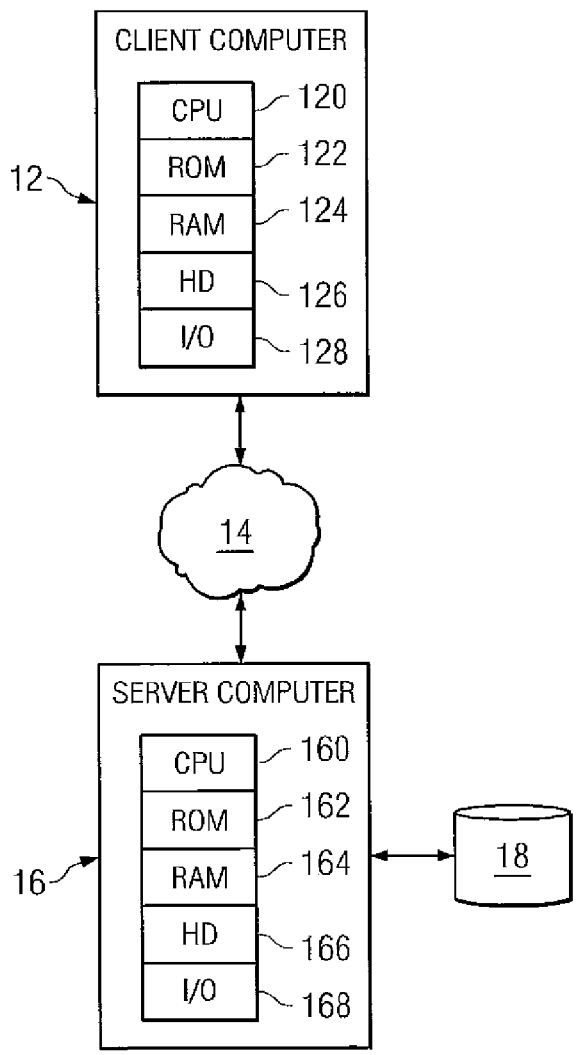
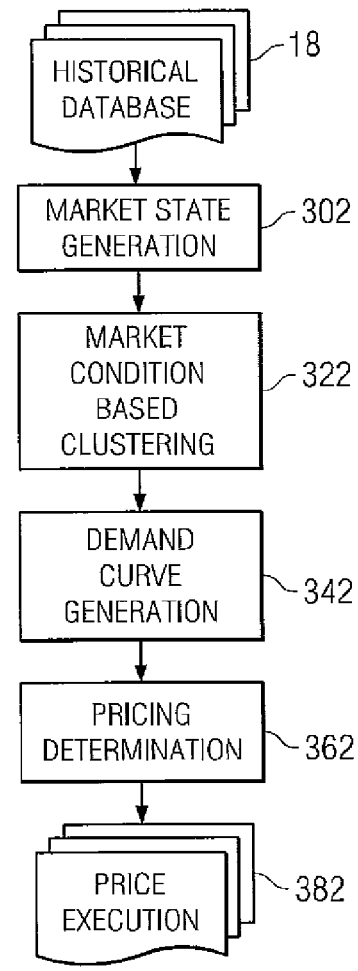
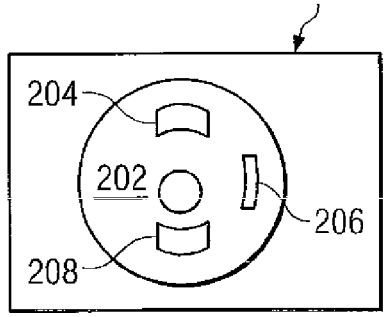
FIG. 1
FIG. 2
FIG. 3

METHOD AND SYSTEM FOR SPOT PRICING VIA CLUSTERING BASED DEMAND ESTIMATION

CROSS REFERENCE TO RELATED APPLICATIONS

This application is related to U.S. patent application Ser. No. 09/919,385 entitled "System and Method for Analyzing Transaction in an Electronic Exchange" by Woestemeyer et al. filed Jul. 31, 2001, which is assigned to the current assignee hereof and incorporated herein by reference.

BACKGROUND OF INVENTION

1. Field of the Invention

This invention relates in general to methods and systems for determining a price for a commodity, and more particularly, to methods and systems for determining a price for a commodity on a spot market.

2. Description of the Related Art

In order to determine the expected demand of a commodity, whether a product or service, for a given unit price on a spot market, a simple price-demand curve can be used. If a company can accurately define a price-demand curve, it can optimize its operations. While price-demand concepts are easy to understand, accurately defining the proper curve has been a problem.

If the company has historical information on prices and quantities sold, the "curve" from the historical data may not look like a curve at all. The data may be scattered (i.e., "noisy"). Due to the noise, many companies have effectively forfeited the idea of a price-demand curve and use something else.

Another problem is that demand curves are not consistent over time. Factors change the shape and location of the demand curve during any particular period in time. Additionally, if a company tries to capture demand and price, the company is looking in only two dimensions. In reality, generation of the demand curves can involve multiple dimensions (i.e., other factors) that can affect prices and demand. When a multi-dimensional problem is limited to considerations in only two dimensions, the problem will typically not be accurately solved.

In another attempt to address the problem, historical data has been filtered. One filter may restrict data to the last few days, meaning only current data is used. Simple filtering does not completely address the problem, and therefore, may not accurately define the proper price-demand curve.

The inability to define accurately a price-demand curve for spot market sales of a commodity means that many companies may not be selling their goods or services at the right price in a manner consistent with the companies"goals. In some industries, the profit margins are low and using any price other than the price optimized for profit may make the difference between generating a profit or turning a loss.

SUMMARY OF INVENTION

A method and system can be used to determine an optimal price of a commodity on a spot market. Market state conditions can be generated using historical data. The historical data may include transactional and other data, such as an environmental or other external condition that may affect the price or demand of a commodity in a spot market. The market state conditions may include nearly any number of attributes. The forecast market state conditions can include a forecast price for the commodity during the next time period. The historical data and market state condition may be used in a clustering module that separates the data into clusters. The cluster with the forecast market state condition is identified, and the data in that cluster is used to generate a price-demand curve for the next time period. The price for the commodity on the spot market during the next time period can be determined consistent with the company's business rules (e.g., maximize profit, revenue, or volume).

The method and system work well because only that data relevant to the market state condition is used. In some instances, older data may be more relevant compared to substantially newer data. The method and system help to generate a price-demand curve that is more accurate to tomorrow's (or the next time period's) spot market for the commodity and have less noise.

In one set of embodiments, a method of determining a price for a commodity can comprise generating a forecast market state condition for a next period. The method can also comprise clustering data from a database into clusters and identifying which cluster corresponds to the forecast market state condition. The method can further comprise generating a price-demand curve using the data from the identified cluster.

In another set of embodiments, a data processing system readable medium can having code embodied therein. The code can comprise instructions for carrying out the methods described herein.

In a further set of embodiments, a system for determining a price for a commodity can comprise a database comprising historical data for the commodity. The system can also comprise a market state generation module that is adapted to generate a forecast market state condition for a next period using the historical data. The system can further comprise a clustering module that is adapted to generate clusters including a specific cluster having the forecast market state condition. The system can still further comprise a demand curve generation module that is adapted to generate a price-demand curve in response to receiving data from the particular cluster from the clustering module.

The foregoing general description and the following detailed description are exemplary and explanatory only and are not restrictive of the invention, as defined in the appended claims.

BRIEF DESCRIPTION OF DRAWINGS

The present invention is illustrated by way of example and not limitation in the accompanying figures.

FIG. 1 includes an illustration of a hardware configuration of a network for use in determining a price for a commodity on a spot market in accordance with a specific, non-limiting embodiment of the present invention.

FIG. 2 includes an illustration of a data processing system storage medium including software code having instructions in accordance with an embodiment of the present invention.

FIG. 3 includes a process flow diagram of a method of determining a price for a commodity on a spot market in accordance with an embodiment of the present invention.

Figure 4:
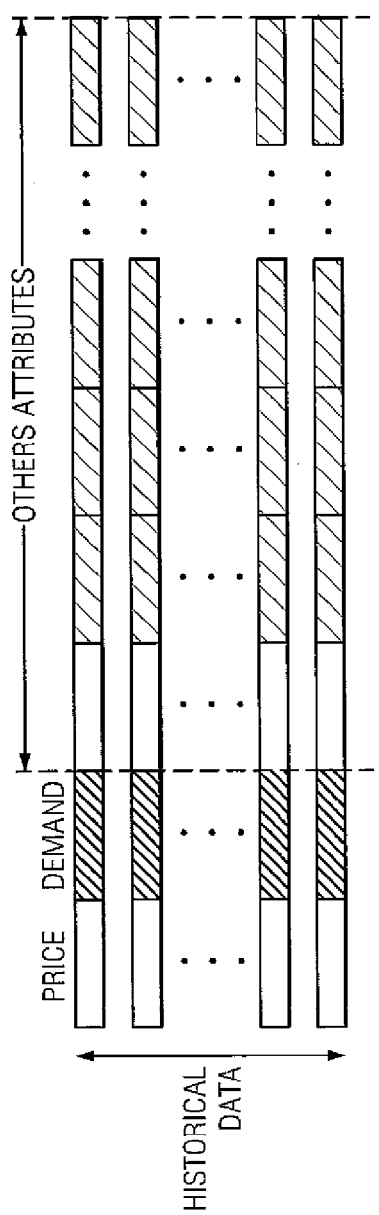
FIG. 4 includes an illustration of data that may be collected for each transaction.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Reference is now made in detail to the exemplary embodiments of the invention, examples of which are illustrated in the accompanying drawings. Wherever possible, the same reference numbers will be used throughout the drawings to refer to the same or like parts (elements).

A method and system can be used to determine an optimal price of a commodity on a spot market. Market state conditions can be generated using historical data. The historical data may include transactional and other data, such as an environmental or other external condition that may affect the price or demand of a commodity in a spot market. The market state conditions may include nearly any number of attributes. The forecast market state conditions can include a forecast price for the commodity during the next time period. The historical data and market state condition may be used in a clustering module that separates the data into clusters. The cluster with the forecast market state conditions is identified, and the data in that cluster is used to generate a price-demand curve for the next time period. The price for the commodity on the spot market during the next time period can be determined consistent with the company's business rules (e.g., maximize profit, revenue, or volume).

The term "company" is to be construed to mean any organization, such as a company, a division of a company, a governmental agency or portion of the agency, or the like.

As used herein, the terms "comprises," "comprising," "includes," "including," "has," "having" and any other variation thereof, are intended to cover a non-exclusive inclusion. For example, a method, process, article, or apparatus that comprises a list of elements is not necessarily limited to only those elements but may include other elements not expressly listed or inherent to such method, process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

The term "module" is intended to mean at least a portion of a computer program (i.e., a software application). Examples include a market state generation module, a clustering module, or the like. Different modules may reside in the same computer program or in different computer programs on the same computer or different computers.

Unless stated to the contrary, the term "price" is intended to mean a unit price. For example, maximum price may be the highest unit price. However, total price can be the product of a quantity and a unit price.

The term "spot market" is intended to mean a market where a commodity, whether in the form of a product or a service, is sold at a point in time or a specific time period under market conditions present during that point in time or time period. Note that today's spot market for a commodity may be different from tomorrow's spot market for the same commodity.

Before discussing embodiments of the present invention, an exemplary hardware architecture for using embodiments of the present invention described. FIG. 1 illustrates an exemplary architecture and includes a network 14 that can be bi-directionally coupled to client computer 12 and server computer 16. Server computer 16 can be bi-directionally coupled to database 18. Database 18 may comprise a historical database that persists historical and potentially other data. Historical database 18 may comprise transactional data including prices and quantities of the commodity sold. The total price for a transaction or set of transactions may be stored in database 18 instead of or in conjunction with a unit price. Network 14 can be an internal network (e.g., a company-owned system) or an external network (e.g., the Internet). Note that FIG. 1 is a simplification of a hardware configuration.

A plurality of other client computers 12 may be bi-directionally coupled to network 14. Along similar lines, server computer 16 may be replaced by a plurality of server computers (not shown) and may be interconnected to each other over network 14 or a combination of networks. Many other alternative configurations are possible and to skilled artisans.

Client computer 12 can include central processing unit ("CPU") 120, read-only memory ("ROM") 122, random access memory ("RAM") 124, hard drive ("HD") or storage memory 126, and input/output device(s) ("I/O") 128. I/O 128 can include a keyboard, monitor, printer, electronic pointing device (e.g., mouse, stylus, trackball, etc.), or the like. Client computer 12 can include a desktop computer, a laptop computer, a workstation, a personal digital assistant, a cellular phone, or nearly other device capable of communicating over a network. Server computer 16 can comprise CPU 160, ROM 162, RAM 164, HD 166, and I/O 168.

Each of the computers in FIG. 1 may have more than one CPU, ROM, RAM, HD, I/O, or other hardware components. For simplicity, each computer is illustrated as having one of each of the hardware components, even if more than one is used. Historical data and other information of the company may be located within any or all of client computer 12, server computer 16, and database 18.

Each of computers 12 and 16 is an example of a data processing system. ROM 122 and 162; RAM 124 and 164; HD 126 and 166; and database 18 can include media that can be read by CPU 120 or 160. Therefore, each of these types of memories includes a data processing system readable medium. These memories may be internal or external to computers 12 or 16.

Portions of the methods described herein may be implemented in suitable software code that may reside within ROM 122 or 162, RAM 124 or 164, or HD 126 or 168. In addition to those types of memories, the instructions in an embodiment of the present invention may be contained on a data storage device with a different data processing system readable storage medium, such as a hard disk. FIG. 2 illustrates a combination of software code elements 204, 206, and 208 that are embodied within a data processing system readable medium 202, on HD 166. Alternatively, the instructions may be stored as software code elements on a DASD array, magnetic tape, floppy diskette, optical storage device, or other appropriate data processing system readable medium or storage device.

In an illustrative embodiment of the invention, the computer-executable instructions may be lines of assembly code, compiled C++, Java, or other language code. Other architectures may be used. For example, the functions of any one of the computers may be performed by a different computer shown in FIG. 1. Additionally, a computer program or its modules with such code may be embodied in more than one data processing system readable medium in more than one computer.

Communications between any of the computers in FIG. 1 can be accomplished using electronic, optical, radio-frequency, or other signals. For example, when a user is at client computer 12, client computer 12 may convert the signals to a human understandable form when sending a communication to the user and may convert input from a human to appropriate electronic, optical, radio-frequency, or other signals to be used by client computer 12 or server computer 16. Similarly, when an operator is at server computer 16, server computer 16 may convert the signals to a human understandable form when sending a communication to the operator and may convert input from a human to appropriate electronic, optical, radio-frequency, or other signals to be used by computers 12 or 16.

Before addressing the method and its details, a brief description of the logic underlying the method is described. Prices for commodities on the spot market tend to be very volatile and difficult to predict using conventional methods. A principal focus of the method is to use the historical data to determine market state conditions for transactions and forecast market conditions, including a forecast price for the next time period. The method can be used to find comparables that take as many of the attributes in the market state condition as possible and try to match them to days or other records in historical database 18 having similar market conditions. In one embodiment, cluster indices may be generated and used to select records to be used in generating a price-demand curve. In this manner, relevant data may be transactions on those days or other records in the history of the company that match the forecast market state conditions. The relevant data can be used to generate a price-demand curve that should reflect the market state conditions for the next time period (e.g., tomorrow). The company can then use the price-demand curve to set tomorrow's price to optimize profit, revenue, volume, or other desires of the company. While reference has been made to days, the method can be used for nearly any other time period, such as weekly, hourly, and potentially other more frequent or less frequent time periods.

Attention is now directed to FIG. 3 that includes an exemplary process flow for determining a price for a commodity sold in a spot market. The commodity may be a product (e.g., oil, gas, chemicals, metals, agricultural products, etc.) or a service (hotel rooms, tickets for concerts or sporting events, etc.).

The method can comprise generating market state conditions (block 302) using data in historical database 18, performing market condition based clustering (block 322), generating a price-demand curve using data from a cluster (block 342), determining a price consistent with the goals of the company (block 362), and executing on the price (block 382).

Note that not all of the activities described in the process flow diagram are required, that an element within a specific activity may not be required, and that further activities may be performed in addition to those illustrated. After reading this specification, skilled artisans will be capable of determining what activities can be used for their specific needs.

The company may collect historical data within database 18. The historical data, as illustrated in FIG. 4, can comprise transactional data including prices and quantities of the commodity and date sold. The number and types of variables monitored and corresponding data collected may be nearly limitless and may not be limited only to purely transactional data. In determining what data to collect and use for generating market state conditions, an analysis may be performed to determine which attributes for the transaction are more relevant to price and demand. The market may be very competitive, and a company may have information on some of its competitors in historical database 18. Other markets may not be as competitive. A company should choose to capture attributes that are relevant to price and demand of the commodity on the spot market.

As a non-limiting example, in the oil industry, the price of a barrel of crude oil may depend on the tensions in the Middle East (e.g., likelihood of war or civil unrest). Therefore, an oil company may want to assign a value of 0-100 corresponding to the tensions within the Middle East for that day and store it within historical database 18. If the likelihood of an impending war is high, the number may be assigned A company should try to capture as much different information as reasonably possible. What may not be very important today may become important two months from now. After reading this specification, skilled artisans will know what data to collect as they will be aware of attributes that affect the prices of their goods or services on the spot market. A company may be break down data many different ways. For example, an oil company may have Terminal A, Terminal B, Terminal C in different geographic locations. The data from the terminals may be kept in historical database 18. In general, the more attributes of a transaction that are captured, the better.

The method can start with market state generation (block 302). The input can comprise historical data collected and residing in historical database 18. The market states may include a list of internal and external information that influence on the price and demand relationship. Some of the market states may be drawn from the existing transactional data in database 18. Other market states may be derived from the transactional data, such as average price per unit sold on a particular date.

The market states may be captured into five main categories including product-based data, customer-based data, competitor-based data, seasonal variations, and special events. Table 1 below includes some exemplary, non-limiting market state attributes corresponding to the categories. After reading this specification, skilled artisans appreciate that other attributes may be used and that similar entries for other industries may be generated. In one embodiment, the market state conditions may have approximately ten attributes. More, fewer, or different attributes may be used.

Table 1

TABLE 1

| Categories | Industries | | | |
| --- | --- | --- | --- | --- |
| | Energy | Airlines | Manufacturing | Services |
| Product or Service | Number of substitutable products in the market. | Number of substitute and competitive flights on the same itinerary. | Number of substitute and competitive products in the same market. | Number of substitute and/or competitor services in the same market. |
| Customer | Number of wholesale/retail customers. | Ratio of different types of customer (e.g., business/total) | Per capita income | Demographic characteristics of customers. |
| Competitor | Number of | Max./Min./ | Posted | Posted |

TABLE 1-continued

| | Industries | | | |
|---|---|---|---|---|
| Categories | Energy | Airlines | Manufacturing | Services |
| | competitor in the market. Max./Min./ average posted prices. Predicted competitor's margin | Average price for the same itinerary. | prices | prices |
| Seasonality | Month of the year Day of the week Day of the month | Holiday season | Holiday season | Seasonality |
| Special Events | Hurricane season War | Winter Olympics | Promotion New product launch | Outbreak |

Figure 5:
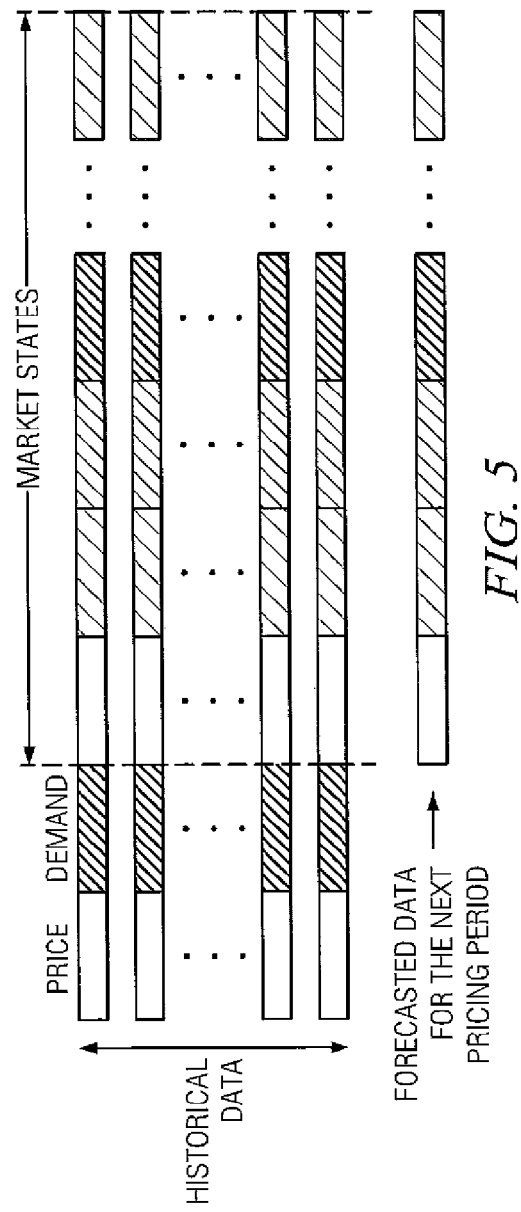
FIG. 5 illustrates market state conditions for transactions including forecast market state conditions for the next period.

From the data in database 18, a number of statistics can be determined including a maximum price for a day, a minimum price for that day, the company's price on that date, the company's price rank compared to its competitors, the nearest higher price(s), a forecast price for the commodity during the next time period, and the like. The forecast price may be based on a predicition of a competitor's price, an index price, or the like. Note that each transaction has a set of corresponding market states as illustrated in FIG. 5. A forecast of the market states for the next pricing period (e.g., tomorrow) can also be calculated. The forecast may in the form of a vector and may include a prediction of tomorrow's price for the commodity on the spot market.

Some of the information used for the market state conditions may come from publicly available sources (e.g., using a future's report in a newspaper for tomorrow's index price) and other information may use the company's internal information.

Market condition based clustering 322 can be performed using the output from the market state generation 302. The concept is to determine which transactions in the historical database 18 most closely match the forecasted market state conditions. In other words, the clustering module is used to find comparables that take as many of the attributes in the forecasted market state conditions as possible and try to match them to day(s) with similar market conditions. The clustering using the market state condition helps to reduce the level of noise in the data used for generating the price-demand curve.

More specifically, the vector for the forecast market state conditions can be used by a clustering module. The clustering module can examines the market state conditions for transactions available or whatever subset is defined as available. The market state conditions for the prior transactions can be compared to the forecast market state conditions to produce a number of records that are within set criteria. As the data are reviewed, the data tend to cluster by their very nature into a number of boxes, some of which will be more relevant than others. Others skilled in the art may use another word for box, such as bucket, bin, cluster, or the like. The relevant data to use will only be the data in the box that has the forecast market state conditions as output from the market state generation 302. For example, the clustering module may break 2000 records for 2000 days into five boxes. The box having tomorrow's data (market state condition) in it will be selected. The data in that box will be the only data that is used for generating the demand curve.

Figure 6:
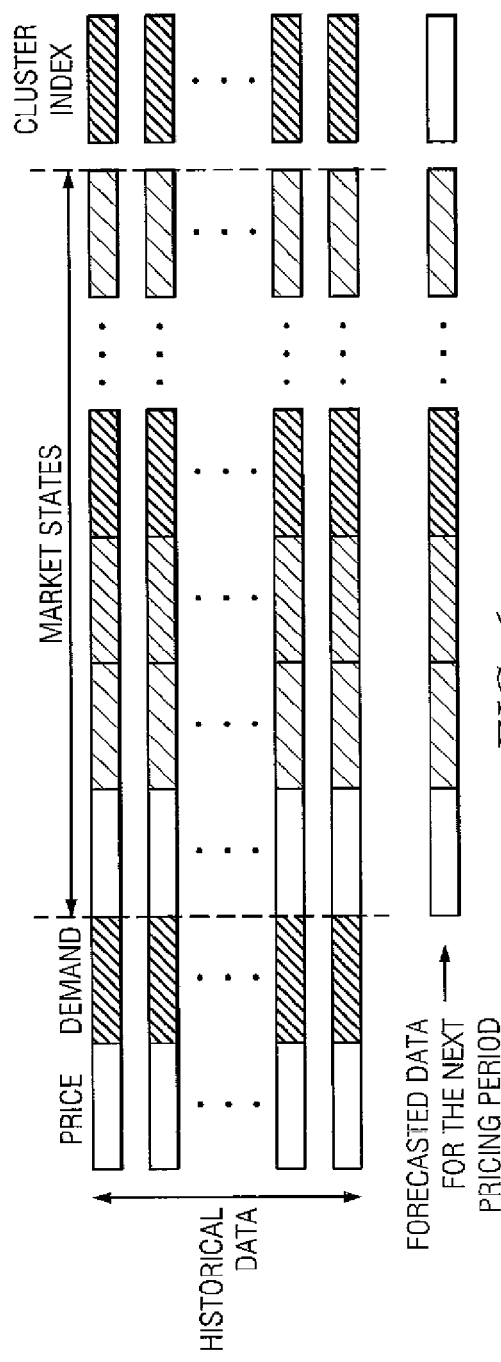
FIGS. 6-7 illustrate market state conditions and clustering indices for transactions including the forecast market state conditions for the next period.
Figure 7:
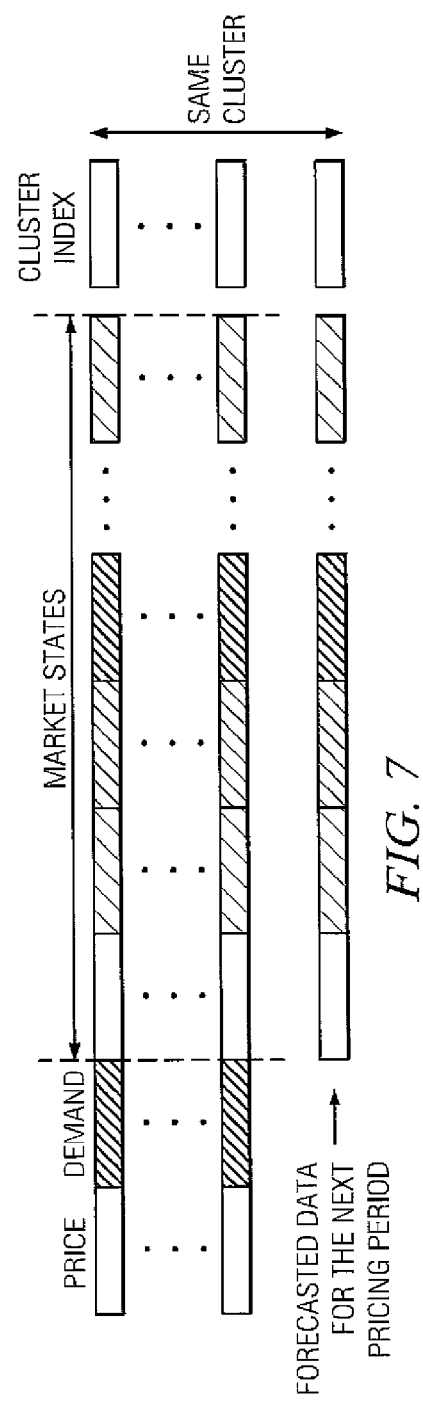

In one embodiment, the clustering 322 can include two acts. A cluster index can be generated for each transaction and the forecasted market state as shown in FIG. 6. Next, the transactions having cluster indices that are the same or similar to the cluster index of the forecasted market state conditions for the next pricing period as shown in FIG. 7.

Returning to the oil example, if the current market state conditions reflect that peace in the Middle East in imminent, the clustering can be used to find other days when peace in the Middle East almost started. Those days may be more relevant. In some instances, records from 13 years ago may be more relevant than newer data, such as records within the past year, because the market conditions today are closer to where they were 13 years ago. In other situations (oil discovered in Antarctica or a different commodity being examined), other days may be relevant.

Instead of having thousands or a very large number of records, the market condition based clustering module 322 may produce only 10-20 records that are most relevant based on the market state conditions or clustering index, which can be sufficient for the purposes of the However, an issue may be that the box with the forecast market state conditions will have no other data or, at the other extreme, too much data. If the number of records in the box is too high or too low, the criteria may be adjusted, so that more or fewer records are obtained (e.g., increase or decrease the number of attributes used). After reading this specification, skilled artisans will know how to adjust statistical algorithms to get the desired number of records.

Figure 8:
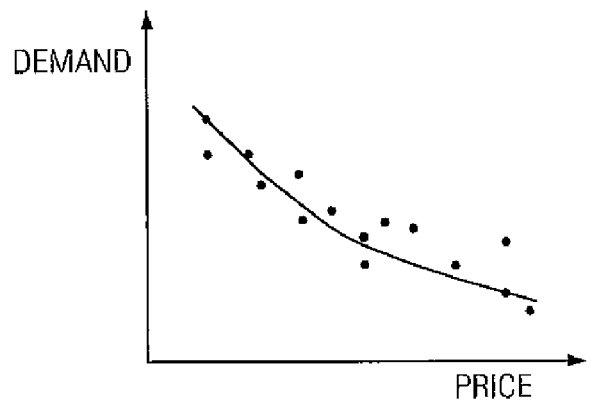
FIG. 8 illustrates a demand curve generated from transactions having the same clustering index.

Demand curve generation 342 takes the records output from market condition based clustering module 322 and generates a price-demand curve as shown in FIG. 8. For the curve generation, approximately 10-20 points work very well. However, more or fewer points may be used. At least two points are needed to generate the curve. At the other extreme, there is no known maximum. However, as the number of points used becomes high, the noise issue as seen with conventional techniques becomes more prevalent.

Some issues may need to be addressed regarding the demand curve generation. One issue may be that three points lie on the same vertical line. A number of statistical methods may be used to determine an average, geometric mean, or other similar value to be used in place of the three points. Another issue may be related to technical problems associated with recording incorrect information into the historical data. Erroneous information may be in the form of outliers. Again, statistical methods can be used to remove the outliers. The price-demand curve as shown in FIG. 8 is the output from the demand generation module. For each price, demand can be determined.

Note that the price-demand curve may only be valid for tomorrow (or the next time period) when selling the commodity on the spot market. The new curve may need to be generated for the following day. Tomorrow, the method as described up to this point would be repeated to give a new market state condition that yields a new price-demand curve.

Pricing determination module 362 may take the output of demand curve generation module 342 and apply business rules of the company to determine an optimal price for the commodity on the spot market consistent those business rules. The company may want to maximum profit, revenue, volume, or the like. While many companies may want to maximize profit, other companies may want to maximize volume to deplete an inventory of an item that the company wants to reduce or eliminate. The business rules can vary from day to day depending on inventory and shipments that are scheduled to arrive tomorrow and potentially other factors.

Figure 9:
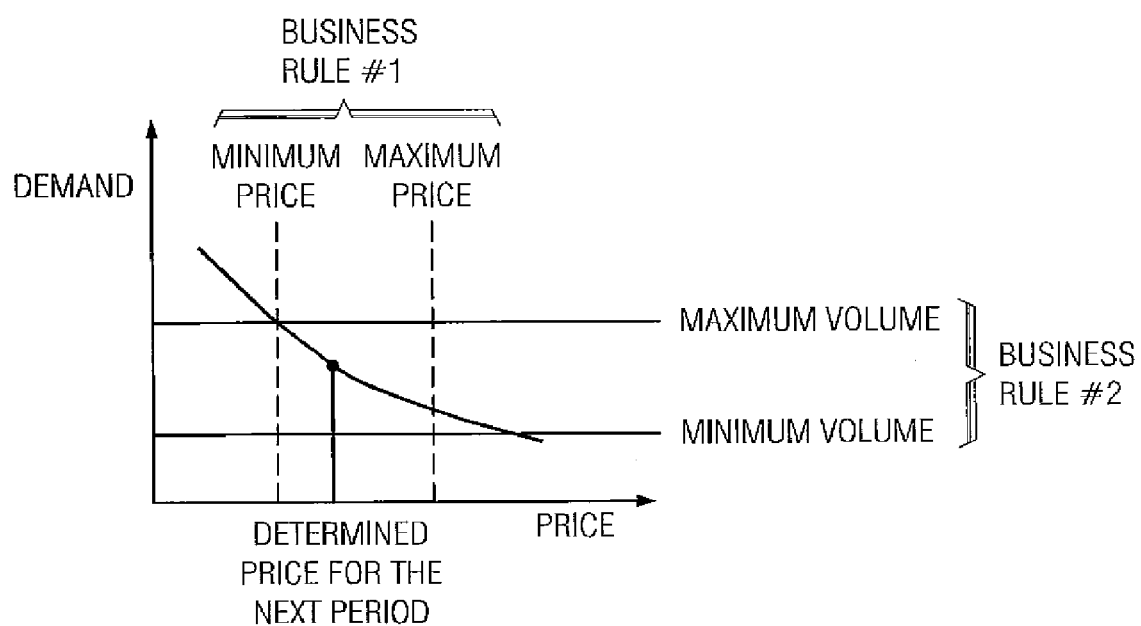
FIG. 9 illustrates the demand curve after applying business rules to the demand curve and determining a price for the next period.

FIG. 9 illustrates two business rules that may be applied to the price-demand curve. One exemplary business rule sets the minimum and maximum prices, and another exemplary business rule sets the minimum and maximum volumes. Other business rules (not shown) may be applied to determine the price for the next period.

The method can further comprise price execution 382. The optimal price can be applied for the transactions tomorrow. If the price is determined for a different time period (e.g., for a week, an hour, etc.), the optimal price from price determination module 362 should be used only for that time period.

Note that some variations can be used with the method and system. For example, a plurality of market state conditions, data from clustering, demand curves, and optimal prices may be obtained for different customers, etc. during the same time period. For example, the company may have a very large customer that has its own data. The large customer's data may yield its own market state conditions, data from clustering, demand curve, and optimal price. Other customers may use at least a part of the remaining data within the historical database 18 to yield market state conditions, data from clustering, demand curve, and optimal price for the other customers. Further granularity between groups of customers may be used (e.g., a group with moderately sized customers, a group with infrequent customers, etc.). Other divisions could be used and may be based on geography (Terminal A, B, and C), demographics, or nearly any other factors.

The method and system described herein have benefits compared to conventional techniques. The method and system may use data collected during the routine operation of a business. Therefore, no extra data needs to be captured. In other embodiments, a company can collect as much or as little additional data as it likes. Market state conditions can be generated using the data within the database to reflect forecast market conditions during the next time period when a commodity is being sold on the spot market.

The clustering should yield data from a historical database that is relevant to the forecast market state conditions. The clustering helps to reduce noise and increase the accuracy of data that is used to generate a price-demand curve for the next time period. A company can then optimize its price for spot market sales of the commodity to maximize profit, revenue, volume, or to achieve other business goal(s) of the company. In industries where profit margins are low, such a method and system can make the difference between making a profit and turning a loss. In other embodiments, the method and system can be used to deplete inventories more quickly, such as selling inventories of seasonal goods near the end of the season.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims.

The invention claimed is:

1. A computer-implemented method of determining a spot price for a commodity on a spot market, comprising:
   generating market states using historical data, wherein the historical data includes transactional data and non-transactional data, wherein the transactional data includes prices and quantities of the commodity and date sold in past transactions, wherein the non-transactional data includes non-transactional information or conditions that affect the spot price or demand of the commodity, wherein the market states include market stat attributes, and wherein the market state attributes include product- or service-based data, customer-based data, competitor-based data, seasonal variations, and special events;
   calculating a forecast of the market states for a next pricing period, wherein the forecast includes a forecast price for the commodity on the spot market during the next pricing period;
   generating a clustering index for each of the past transactions and each of the forecasted market states;
   comparing clustering indices of the past transactions and the forecasted market states for the next pricing period; and
   generating a price-demand curve for the commodity on the spot market for the next pricing period using records from the past transactions having clustering indices that are the same or comparable to the cluster index of the forecasted market states for the next pricing period.

2. The computer-implemented method of claim 1, wherein the forecast of the markets states for a next pricing period comprises at least one of a maximum price for the commodity, a minimum price for the commodity, a company's price rank, or the nearest higher price of the commodity.

3. The computer-implemented method of claim 1, wherein generating is performed without using data from any other cluster.

4. The computer-implemented method of claim 1, further comprising determining the spot price for the commodity on the spot market for the next pricing period using the price-demand curve.

5. The computer-implemented method of claim 4, wherein determining the spot price for the commodity on the spot market comprises determining the spot price consistent with maximizing profit, volume, and revenue.

6. The computer-implemented method of claim 1, wherein the commodity is a product.

7. The computer-implemented method of claim 1, wherein the commodity is a service.

8. A computer readable medium having code embodied therein, which when executed causes a computer to perform the steps comprising:
   an instruction for generating market states using historical data, wherein the historical data includes transactional data and non-transactional data, wherein the transactional data includes prices and quantities of the commodity and date sold in past transactions, wherein the non-transactional data includes non-transactional information or conditions that affect the spot price or demand of the commodity, wherein the market states include market state attributes, and wherein the market state attributes include product- or service-based data, customer-based data, competitor-based data, seasonal variations, and special events;

an instruction for calculating a forecast of the market states for a next pricing period, wherein the forecast includes a forecast price for the commodity on the spot market during the next pricing period;

an instruction for generating a clustering index for each of the past transactions and each of the forecasted market states;

an instruction for comparing clustering indices of the past transactions and the forecasted market states for the next pricing period; and an instruction for generating a price-demand curve for the commodity on the spot market for the next pricing period using records from the past transactions having clustering indices that are the same or comparable to the cluster index of the forecasted market states for the next pricing period.

9. The computer readable medium of claim 8, wherein the forecast market state condition comprises at least one of a maximum price for the commodity, a minimum price for the commodity, a company's price rank, or the nearest higher price of the commodity.

10. The computer readable medium of claim 8, wherein the instructions for generating is executed without using data from any other cluster.

11. The computer readable medium of claim 8, wherein the code further comprises an instruction for determining a spot price for the commodity on the spot market for the next pricing period using the price-demand curve.

12. The computer readable medium of claim 8, wherein the instruction for determining the spot price for the commodity comprises an instruction for determining the spot price consistent with maximizing profit, volume, or revenue.

13. The computer readable medium of claim 8, wherein the commodity is a product.

14. The computer readable medium of claim 8, wherein the commodity is a service.

15. A system for determining a spot price for a commodity on a spot market, comprising:

a database comprising historical data for the commodity, wherein the historical data includes transactional data and non-transactional data, wherein the transactional data includes prices and quantities of the commodity and date sold in past transactions, wherein the non-transactional data includes non-transactional information or conditions that affect the spot price or demand of the commodity, wherein the market states include market state attributes, and wherein the market state attributes include product- or service-based data, customer-based data, competitor-based data, seasonal variations, and special events;

a processor comprising:

a market state generation module that is adapted to generate market states using the historical data and a forecast of the market states for a next pricing period;

a clustering module that is adapted to generate a clustering index for each of the past transactions and each of the forecasted market states;

a demand curve generation module that is adapted to generate a price-demand curve for the commodity on the spot market for the next pricing period using records from the past transactions having clustering indices that are the same or comparable to the cluster index of the forecasted market states for the next pricing period.

16. The system of claim 15, further comprising a price determination module that is adapted to use a demand curve from the demand curve generation module and a business rule to determine the spot price for the commodity on the spot market for the next pricing period.

17. The system of claim 15, wherein:

the market state comprises a prediction of the spot price for the commodity during the next pricing period; and the records used by the demand curve generation module comprise the prediction of the spot price for the commodity.

\* \* \* \* \*